United States Patent [19]

O'Mahony

[11] 4,298,842
[45] Nov. 3, 1981

[54] HETEROPOLAR MACHINE FOR DEMODULATING POLYPHASE VOLTAGES INTERFERING AMONG THEMSELVES

[76] Inventor: Gérard O'Mahony, 95 rue de Versailles, 22410 Ville d'Avray, France

[21] Appl. No.: 47,757

[22] Filed: Jun. 12, 1979

[30] Foreign Application Priority Data

Jun. 14, 1978 [FR] France .................. 78 17836

[51] Int. Cl.³ .............................................. H03D 3/18
[52] U.S. Cl. ........................................ 329/50; 329/2; 329/207
[58] Field of Search ................ 329/1, 50, 199, 2, 200, 329/198, 207; 310/161, 162

[56] References Cited
U.S. PATENT DOCUMENTS 3,049,673 8/1962 Barry .................................... 329/199

*Primary Examiner*—David K. Moore
*Attorney, Agent, or Firm*—Burns, Doane, Swecker & Mathis

[57] ABSTRACT

A demodulator for the demodulation of polyphase voltages of n phases, interfering among themselves which constitute a system of polyphase pseudo-sinusoidal voltages modulated in amplitude to a pulsation $\epsilon$, in order to obtain a system of polyphase voltages of pulsation $\epsilon$. The demodulator is preferably formed by n heteropolar synchronous rotating polyphase machines and includes n stators of n phases, fed by n systems of polyphase pseudo-sinusoidal voltages modulated in amplitude to a pulsation $\epsilon$, and of the form $$U_{ip} = U_0 \sin\left(\omega_1 t + \frac{2\pi p}{n}\right) + U_0 \sin\left(\omega_2 t + \frac{2\pi(i+p)}{n}\right),$$

in which i represents the index of the group of voltages and varies from 1 to n, and p represents the index of phase of the group of voltages and varies from 1 to n. Mounted for rotation with the n stators are n wound rotors, each including magnetic circuits made up of a low loss material and capable of passing an alternating magnetic flux without damping, each rotor having the same number of poles as the corresponding stator. Sliprings that rotate with the rotors and stationary brushes are provided to collect n systems of polyphase voltages of pulsation $\epsilon$ from the n rotors.

22 Claims, 5 Drawing Figures

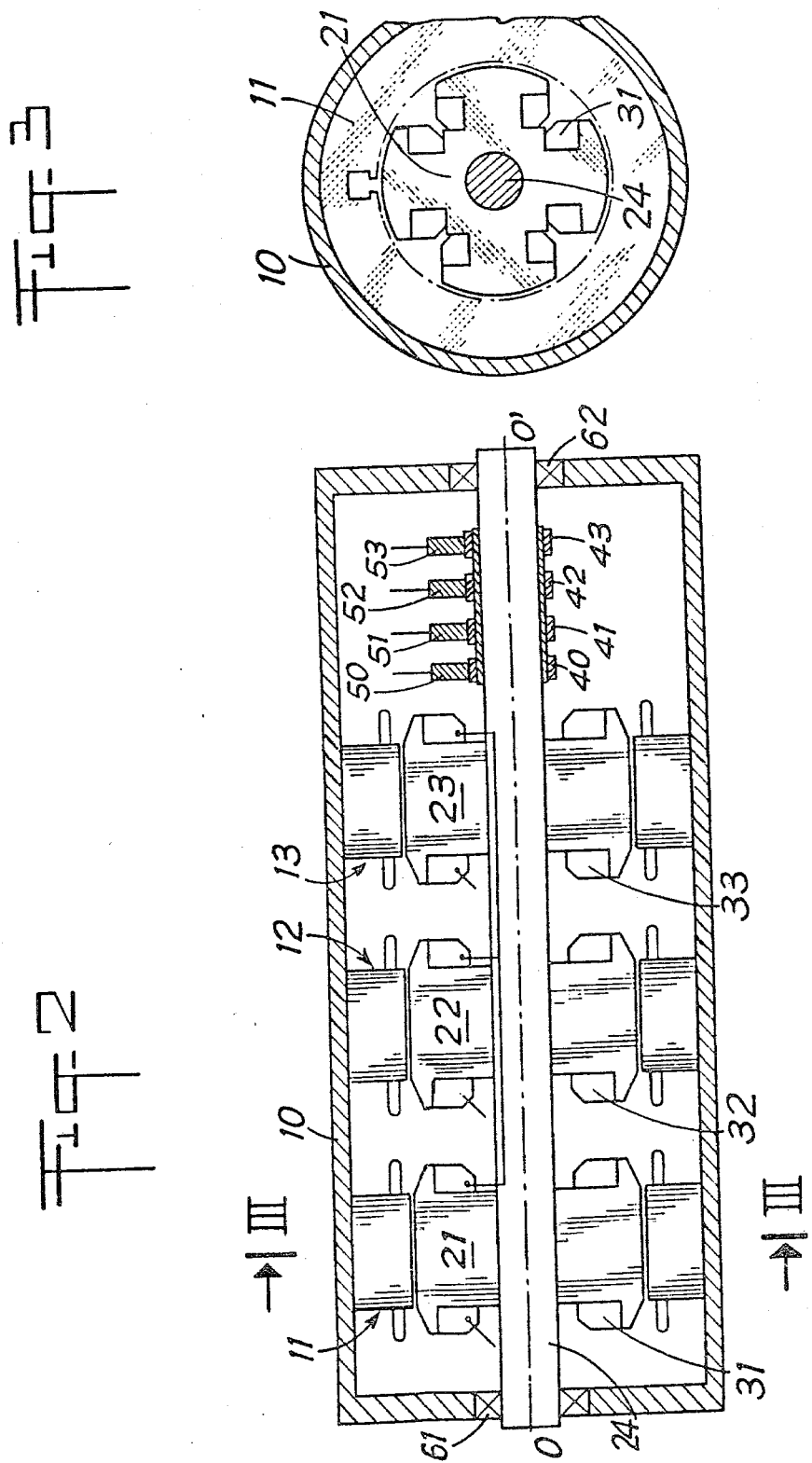

HETEROPOLAR MACHINE FOR DEMODULATING POLYPHASE VOLTAGES INTERFERING AMONG THEMSELVES

BACKGROUND OF THE INVENTION

This invention pertains to a demodulator applicable to the demodulation of polyphase voltages of n phases, interfering among themselves, and which create a system of polyphase pseudo-sinusoidal voltages, modulated in amplitude to a pulsation $\epsilon$, in order to obtain a system of polyphase voltages of pulsation $\epsilon$.

The interference between two sinusoidal voltages of frequency $f_1$, $f_2$ or pulsation $\omega_1$, $\omega_2$, (where $\omega_1 = \omega_2 = 2\pi f_2$ and $\omega_2 = 2\pi f_2$ and of different amplitudes $U_1$, $U_2$, is a well known phenomenon, currently used in radio, in the technique of synchroscopes, of transmitters, etc.

This phenomenon may be summarized by the following equation:

$$U(t) = U_1 \sin \omega_1 t + U_2 \sin \omega_2 t = 2U_o\cos(\epsilon t) \sin(\omega t) + 2e \sin(\epsilon t)\cos(\omega t) \quad (1)$$

in which
$\omega_1 = \omega + \epsilon$
and
$U_1 = U_o + e$
$\omega_2 = \omega - \epsilon$
$U_2 = U_o - e$ with $\omega$: average pulsation and $U_o$ = average voltage of the component sinusoidal voltages.

Of course, if two systems of polyphase voltages are placed in series, phase to phase, the result is the production of n voltages $U_p$ analogous to the preceding one and within the same envelope, but staggered between themselves by $2\pi/n$, n being the number of phases of each system, such that:

$$U_p = U_1 \sin\left(\omega_1 t + \frac{2\pi p}{n}\right) + U_2 \sin\left(\omega t_2 + \frac{2\pi p}{n}\right) \quad (2)$$

in which p may take all the values from 1 to n.

Further, if the differential voltage $e = 0$, that is if $U_1 = U_2 = U_o$, the resulting voltage $u(t) = 2U_o \cos \epsilon t \sin \omega t$ may be described as a pseudo-sinusoidal voltage of pulsation, $\omega$, and variable amplitude $2U_o \cos \epsilon t$. The same is true for the voltages resulting from the two polyphase systems placed in series, phase to phase, and previously described.

In addition, considering n groups of n voltages resulting from the two polyphase systems of the kind previously described, and if in each case there is performed circular permutations of the phases of the second polyphase system in relation to the first, the result is n groups of voltages with the general characteristics of those of the first group, but the respective envelopes of which are staggered between themselves. The n groups of polyphase voltages $U_{ip}$, may be expressed as:

$$U_{ip} = U_o\sin\left(\omega_1 t + \frac{2\pi p}{n}\right) + U_o\sin\left(\omega_2 t + \frac{2\pi(i+p)}{n}\right) \quad (3)$$

in which i represents the index of the group of voltages and varies from 1 to n, and p represents the index of phase in a group of voltages and varies from 1 to n.

For example for triphase systems, the 3 resulting voltages ($U_{a1}$, $U_{a2}$, $U_{a3}$), ($U_{b1}$, $U_{b2}$, $U_{b3}$), and $U_{c1}$, $U_{c2}$, $U_{c3}$) form three "pseudo-sinusoidal" systems, with variable amplitudes respectively equal to $U_{Ao} = 2U_o \cos \epsilon t$, $$U_{bo} = 2U_o \cos\left(\epsilon t - \frac{2\pi}{3}\right), \; U_{Co} = 2U_o\cos\left(\epsilon t + \frac{2\pi}{3}\right). \quad (4)$$

This invention has as an object to provide new appropriate means for using this "pulsating" phenomenon, in particular, to produce a system of polyphase voltages with a given, constant or variable, frequency f, and corresponding to the modulation in amplitude of the component voltages of the said systems of polyphase voltages of the kind described in equation above.

U.S. patent application Ser. No. 33,957 filed on Apr. 27, 1979 in the name of the same applicant entitled "Demodulator of polyphase voltages interfering among themselves", concerns a demodulator of the kind mentioned previously and which comprises a rotating polyphase machine, including basically: (a) n armatures at n phases connected between themselves by a common yoke made up of a low loss material and fed by n systems of polyphase pseudo-sinusoidal voltages modulated in amplitude to a pulsation $\epsilon$, (b) a rotor freely rotating, including n circuits connected by a common magnetic axle, made up, in its useful parts, of a low loss magnetic material, and (c) n static coils, concentric with the axis of the magnetic axle and at the terminals of which n systems of polyphase voltages of pulsation $\epsilon$ are collected, which rotating machine is such that each of the n magnetic circuits of the rotor bears a number of polar masses equal to the number of pairs of poles on the corresponding armature, and that the relative geometric keyings of the homologous phases of the n armatures of the stator are identical to the relative longitudinal keyings of the polar masses of the rotor.

Such a demodulator permits the realization of machines, the size and weight of which are relatively small compared to the speeds of rotation which may be very high. However, in such a demodulator, it is important to create altogether a common frame made up of low loss material and a rotor with a common magnetic axle to allow the closing of the lines of the magnetic field. These requirements, in some cases, may turn out to be a hindrance to the extent that they prevent the use of elements from entirely classical electric machines.

This invention aims precisely at permitting the creation of a demodulator of simple design and at a relatively small cost starting from elements of rotating machines especially easy to manufacture from known techniques, in particular, those applied to synchronous machines. These and other goals are met in accordance with the invention by a demodulator applicable to the demodulation of polyphase pseudo-sinusoidal voltages modulated in amplitude to a pulsation $\epsilon$, in order to obtain a system of polyphase voltages of pulsation $\epsilon$ by employing a complex of n polyphase synchronous heteropolar rotating machines including n stators at n phases fed by n systems of polyphase pseudo-sinusoidal voltages, modulated in amplitude to a pulsation $\epsilon$, and of the form $$U_{ip} = U_o \sin\left(\omega_1 t + U_o \sin\left(\omega_2 t + \frac{2\pi(i+p)}{n}\right)\right)$$

in which i represents the group index of the voltages and varies from 1 to n and p represents the phase index of the group of voltages and varies from 1 to n. Mounted for rotation within the n stators are n wound rotors each including magnetic circuits made up of a low loss magnetic material and capable of passing a magnetic alternating flux without damping, each rotor having the same number of poles as the corresponding stator.

Means to collect from the n rotors, n systems of polyphase voltages of pulsation $\epsilon$ are also provided.

The means for collecting the n systems of polyphase voltages of pulsation $\epsilon$ from the n rotors may be readily provided by means of a slip-ring integral with the rotors and fixed brushes contacting the slip-rings.

Thus, in a demodulator according to the invention, there is no need to have a frame and a common axle made up of a low loss material and capable of permitting the passage of a magnetic flux since the machine according to the invention is of a heteropolar kind. In addition, with the exception of using a foliated rotor capable of permitting the passage of an alternating flux, the demodulator according to the invention permits the use of techniques used with synchronous machines.

According to a specific embodiment of the invention, the n stators associated with their rotors constitute n similar synchronous heteropolar machines, mechanically independent. Thus, for example, for a demodulator of the triphase kind, it is enough to associate three synchronous heteropolar machines meeting the conditions which have been mentioned previously, and fed by means of three systems of triphase pseudo-sinusoidal voltages, modulated in amplitude to a pulsation $\epsilon$, and conforming to the equations (3), to collect on each of the rotor windings a system of pseudo-triphase voltages conforming to the equations (4).

According to another embodiment of the invention, the n stators associated to the n corresponding coiled rotors are mounted on the same frame and the n magnetic circuits of the rotors are supported by a common axle. This embodiment results in a compact machine in which the number of bearings is reduced, and in which the number of slip-rings may also be reduced eventually to the number of magnetic circuits of the rotor plus one, each rotor winding being associated with an independent slip-ring and also to a slip-ring common to the n rotor windings and serving as a neutral.

Other objects, characteristics and advantages of the invention will be better understood upon reading the following detailed description of specific forms of the invention, given only as non-limiting examples, with reference to the attached drawings.

BRIEF DESCRIPTION OF THE DRAWINGS

FIG. 2 represents a schematic view of an axial section of a specific embodiment of a triphase demodulator according to the invention; and, FIG. 3 shows a sectional view of the demodulator of FIG. 2 taken along the line III—III.

DETAILED DESCRIPTION

Figure 1C:
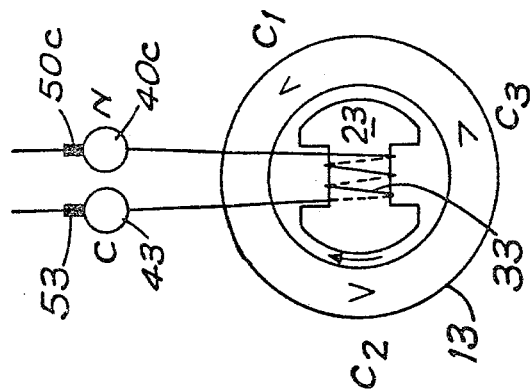
FIGS. 1a to 1c represent schematic sectional views of each of the three stator/rotor arrangements of a triphase demodulator according to the invention.
Figure 1B:
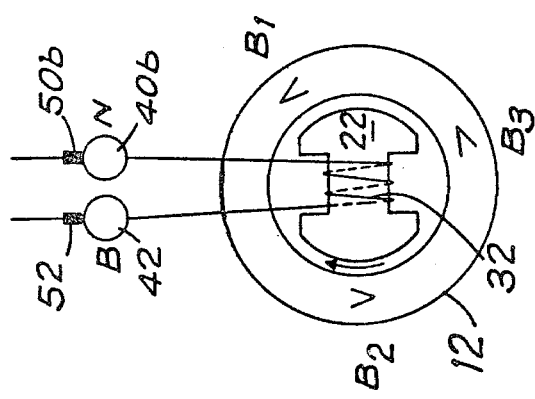
Figure 1A:
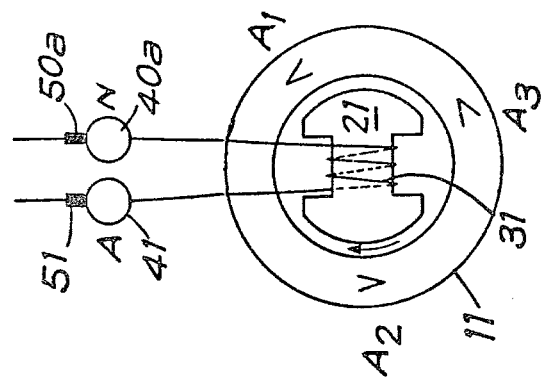

FIGS. 1a–1c provide sectional diagrams of a triphase demodulator according to the invention. The illustrated demodulator is structured for a three phase system but it will be appreciated that the principles of the invention are applicable to other electrical systems as well.

Referring to FIGS. 1a–1c, the embodiment of the demodulator there shown includes three triphase armatures 11, 12, and 13 each including three phases $A_1$, $A_2$, and $A_3$, respectively for the armature 11 (FIG. 1a), $B_1$, $B_2$, and $B_3$ for armature 12 (FIG. 1b), and $C_1$, $C_2$, and $C_3$ for armature 13 (FIG. 1c).

The phases ($A_1$, $A_2$, $A_3$), ($B_1$, $B_2$, $B_3$), and ($C_1$, $C_2$, $C_3$) of the armatures 11, 12, and 13 are respectively fed by the resulting voltages ($U_{a1}$, $U_{a2}$, $U_{a3}$), ($U_{b1}$, $U_{b2}$, $U_{b3}$), and ($U_{c1}$, $U_{c2}$, $U_{c3}$) previously described and provided by a pulsating generator such as the generator described, for example, in U.S. patent application Ser. No. 33,955 filed under the name of the same applicant, and entitled "Pulsating generator for the production of systems of polyphase voltages of interference".

Each stator or armature 11, 12, and 13 may be in its structure, strictly similar to a stator of a classical triphase synchronous motor. Each armature 11, 12, and 13 works together with a respective coiled rotor 21, 22, and 23 each provided with windings 31, 32, and 33, respectively. While FIGS. 1a, 1b and 1c, by way of example, show magnetic circuits of bipolar or quadripolar rotor construction with jutting poles, it should be understood however, that the invention is also applicable to magnetic circuits of multipolar rotor including an even number of jutting poles. Moreover, smooth rotors are particularly advantageous when the speeds involved are high.

Each rotor 21, 22, and 23 is made up of low loss foliated material in order to permit the passage of alternating flux. It should be noted that the need for passing alternating flux makes it imperative to use rotors without damping circuits, that is without short circuited windings or full or partial squirrel-cage windings.

The windings 31, 32, and 33 work together with a set of slip-rings 41 to 43, 40a to 40c and brushes 51 to 53, 50a to 50c which permit the collection of the systems of triphase voltages $U_A$, $U_B$, and $U_C$ of frequency $f = \pi/2$ corresponding to the equations (4). Each winding 31, 32, and 33 is connected to a slip-ring 41, 42, and 43 respectively corresponding to a phase A, B, and C, respectively, and to a slip-ring 40a, 40b, and 40c respectively corresponding to the neutral N. The brushes 51 to 53, and 50a to 50c work together with the slip-rings 41 to 43 and 40a to 40c in the classical manner, to collect the systems of demodulated triphase voltages produced.

The operation of the demodulator, according to the invention, is as follows. Each stator 11, 12, and 13 is fed by a triphase voltage, the carrier of which is a voltage with a pulsation $\omega$, modulated in amplitude to a pulsation $\epsilon$. The voltages generate, in the airgap of each synchronous machine 11, 21; 12, 22; and 13, 23, a magnetic flux rotating at an angular velocity $\omega$ (in the case where the machine is bipolar) and of an amplitude which varies sinusoidally at the pulsation $\epsilon$. This flux drives the rotor at a speed $\omega$, in the manner of a synchronous motor with variable reluctance running without any load. The variation of amplitude of the rotating flux, in relation to the time, induces in the rotor windings a sinusoidal voltage having the same pulsation $\epsilon$ as the pulsation of the modulation of the input voltages.

To the extent that the three similar complexes 11, 21; 12, 22; and 13, 23 are fed in the above described manner, and that the relative phases of the three modulations are staggered by $2\pi/3$, that is where the alternating flux produced by each of the three armatures 11, 12 and 13 are of respective values $$\phi 1 = \phi\cos\epsilon t, \phi 2 = \phi\cos\left(\epsilon t - \frac{2\pi}{3}\right),$$

$$\text{and } \phi 3 = \phi\cos\left(\epsilon t + \frac{2\pi}{3}\right),$$

the three rotor windings are the center of a system of triphase voltages of pulsation which are collected by means of the systems of slip-rings 41 to 43, 40a to 40c and of brushes 51 to 53, 50a to 50c.

According to one embodiment, the three elementary synchronous machines 11, 21; 12, 22; and 13, 23 which constitute the demodulator are mechanically independent and form three distinct units. Thus, it is easy to realize a demodulator according to the invention starting from three synchronous heteropolar quasi standard machines, the rotors alone being especially conceived for transmitting alternating flux, and consequently being made up of foliated material and without any damping.

Another embodiment is represented in FIG. 2 wherein like reference numbers have been used to designate like elements described previously in connection with FIG. 1. It can be seen in FIG. 2 that three elementary synchronous machines are associated within a common frame 10. In this embodiment, the three magnetic circuits of rotor 21, 22, and 23 are supported by a common axle 24. The number of bearings is also reduced since the two end bearings 61 and 62 are sufficient for the whole of the machine. In addition, the "integrated" setting of the magnetic circuits of rotor permits to use eventually only three or four slip-rings 40-43. As shown in FIG. 2, the creation of a common connection serving as neutral, for the three rotor windings 31, 32, and 33 permits to use a common system slip-ring 40 brush 50 for the neutral while the systems of slip-rings 41, 42, and 43 and brushes 51, 52, and 53 are similar to the general case shown on FIG. 1, but are re-grouped at one end of the axle 24.

While in the compact frame of FIG. 2 the magnetic circuits of rotor 21, 22, and 23 must indeed be foliated and capable of passing an alternating flux, the frame 10 does not come into play for the transmission of the magnetic flux and does not need to be made up of a low loss material.

Of course various modifications and additions may be made, by one skilled in the art to which the invention pertains, to the settings that have been described only as non-limitating examples, without departing from the scope of the invention as set forth in the attached claims. Thus, for example, in the case of an "integrated" setting for the magnetic rotor circuits, the number of slip-rings and brushes may be strictly equal to the n number of rotors and stators, or equal to n+1, as previously described, in the case where the neutral is taken from a slip-ring common to the n rotor windings.

What is claimed is:

1. A demodulator for demodulating polyphase voltages at n phases interfering among themselves and which create a system of polyphase pseudo-sinusoidal voltages modulated in amplitude to a pulsation $\epsilon$, in order to obtain a system of polyphase voltages of pulsation $\epsilon$, the demodulator comprising n polyphase synchronous heteropolar rotating machines including:

(a) n stators at n phases fed by n systems of polyphase pseudo-sinusoidal voltages modulated in amplitude to a pulsation $\epsilon$, and of the form:

$$U_{ip} = U_o\sin\left(\omega_1 t + \frac{2\pi p}{n}\right) + U_o\sin\left(\omega_2 t + \frac{2\pi(i + p)}{n}\right)$$

in which i represents the group index of the voltages and varies from 1 to n, and p represents the index of phase in the group of voltages and varies from 1 to n, (b) n wound rotors mounted within said n stators and each including magnetic circuits made up of a low loss magnetic material and capable of transmitting an alternating magnetic flux without damping, each rotor having the same number of poles as a corresponding stator, and (c) means for collecting from the n rotors, n systems of polyphase voltages of pulsation $\epsilon$.

2. A demodulator according to claim 1 in which the means for collecting on said n rotors, n systems of polyphase voltages of pulsation $\epsilon$, include a plurality of slip-rings mounted for rotation with the rotors and a plurality of fixed brushes each in contact with an associated one of the slip-rings.

3. A demodulator according to claim 1 in which the n stators associated to the n corresponding wound rotors are set within a common frame, and in which the magnetic circuits of the n rotors are supported by a common axle.

4. A demodulator according to claim 1 in which the n stators associated with the n rotors constitute n similar synchronous heteropolar machines, each mechanically independent of the others.

5. A demodulator according to claim 3 in which the means for collecting on said n rotors, n systems of polyphase voltages of pulsation $\epsilon$, include a plurality of slip-rings mounted for rotation with the rotors and a plurality of fixed brushes each in contact with an associated one of the slip-rings.

6. A demodulator according to claim 4 in which the means for collecting on said n rotors, n systems of polyphase voltages of pulsation $\epsilon$, include a plurality of slip-rings mounted for rotation with the rotors and a plurality of fixed brushes each in contact with an associated one of the slip-rings.

7. A demodulator according to claim 2 in which the number of slip-rings is equal to the number of magnetic circuits of the rotors, plus one, and in which each wound rotor has a rotor winding connected at one end to an independent slip-ring, and at the other end to a slip-ring connected in common to the n rotor windings and serving as neutral.

8. A demodulator according to claim 5 in which the number of slip-rings is equal to the number of magnetic circuits of the rotors, plus one, and in which each wound rotor has a rotor winding connected at one end to an independent slip-ring, and at the other end to a slip-ring connected in common to the n rotor windings and in which each wound rotor has a winding associated with an independent slip-ring.

9. A demodulator according to claim 2 in which the number of slip-rings is equal to the number of magnetic circuits of the rotors, plus one, and in which each wound rotor has a rotor winding connected at one end to an independent slip-ring, and at the other end to a slip-ring connected in common to the n rotor windings and serving as neutral.

10. A demodulator according to claim 5 in which the number of slip-rings is equal to the number of magnetic circuits of the rotors, plus one, and in which each wound rotor has a rotor winding connected at one end to an independent slip-ring and at the other end to a slip-ring connected in common to the n rotor windings and serving as neutral.

11. A demodulator according to claim 1 in which n is equal to 3.

12. A demodulator according to claim 2 in which n is equal to 3.

13. A demodulator according to claim 3 in which n is equal to 3.

14. A demodulator according to claim 4 in which n is equal to 3.

15. A demodulator according to claim 7 in which n is equal to 3.

16. A demodulator according to claim 9 in which n is equal to 3.

17. A demodulator according to claim 1 in which the magnetic circuits of the rotor have smooth poles.

18. A demodulator according to 1 in which the magnetic circuits of the rotor have jutting poles.

19. A demodulator according to claim 3 in which the magnetic circuits of the rotor have jutting poles.

20. A demodulator according to claim 4 in which the magnetic circuits of the rotor have jutting poles.

21. A demodulator according to claim 7 in which the magnetic circuits of the rotor have jutting poles.

22. A demodulator according to claim 9 in which the magnetic circuits of the rotor have jutting poles.

* * * * *